US011347926B2

(12) United States Patent
Chao

(10) Patent No.: US 11,347,926 B2
(45) Date of Patent: *May 31, 2022

(54) OPTICAL MODE OPTIMIZATION FOR WAFER INSPECTION

(71) Applicant: Taiwan Semiconductor Manufacturing Co., Ltd., Hsinchu (TW)

(72) Inventor: Bing-Siang Chao, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,174

(22) Filed: Dec. 14, 2020

(65) Prior Publication Data

US 2021/0097226 A1 Apr. 1, 2021

Related U.S. Application Data

(63) Continuation of application No. 16/250,128, filed on Jan. 17, 2019, now Pat. No. 10,867,108.

(Continued)

(51) Int. Cl.
G06F 30/398 (2020.01)
G03F 7/20 (2006.01)
H01L 21/66 (2006.01)
G06F 111/06 (2020.01)
G06F 30/30 (2020.01)
G06F 119/18 (2020.01)
G06F 119/22 (2020.01)

(52) U.S. Cl.
CPC ............ *G06F 30/398* (2020.01); *G03F 7/705* (2013.01); *G03F 7/7065* (2013.01); *G03F 7/70433* (2013.01); *G03F 7/70491* (2013.01); *G03F 7/70616* (2013.01); *H01L 22/12* (2013.01); *G06F 30/30* (2020.01); *G06F 2111/06* (2020.01); *G06F 2119/18* (2020.01); *G06F 2119/22* (2020.01)

(58) Field of Classification Search
None
See application file for complete search history.

(56) References Cited

U.S. PATENT DOCUMENTS 6,886,153 B1 4/2005 Bevis
7,877,722 B2 1/2011 Duffy et al.
(Continued)

OTHER PUBLICATIONS

"Defect Inspection Review", printed from https://www.kla-tencor.com/products/chip-manufacturing/defect-inspection-review.html#2930, 9 pages, date unknown.

Primary Examiner — Leigh M Garbowski
(74) Attorney, Agent, or Firm — Haynes and Boone, LLP

(57) ABSTRACT

According to some embodiments, the present disclosure provides a method for determining wafer inspection parameters. The method includes identifying an area of interest in an IC design layout, performing an inspection simulation on the area of interest by generating a plurality of simulated optical images from the area of interest using a plurality of optical modes, and selecting, based on the simulated optical images, at least one of the optical modes to use for inspecting an area of a wafer that is fabricated based on the area of interest in the IC design layout.

20 Claims, 14 Drawing Sheets

Related U.S. Application Data

(60) Provisional application No. 62/732,813, filed on Sep. 18, 2018.

(56) References Cited

U.S. PATENT DOCUMENTS

| | | |
|---|---|---|
| 8,073,240 B2 | 12/2011 | Fischer et al. |
| 8,126,255 B2 | 2/2012 | Bhaskar et al. |
| 8,796,666 B1 | 8/2014 | Huang et al. |
| 8,850,366 B2 | 9/2014 | Liu et al. |
| 8,906,595 B2 | 12/2014 | Liu et al. |
| 8,923,600 B2 | 12/2014 | Zafar et al. |
| 8,954,899 B2 | 2/2015 | Wu et al. |
| 9,093,530 B2 | 4/2015 | Huang et al. |
| 9,224,660 B2 | 12/2015 | Kulkarni et al. |
| 9,310,316 B2 | 4/2016 | Wu et al. |
| 9,367,655 B2 | 6/2016 | Shih et al. |
| 9,390,217 B2 | 7/2016 | Wang et al. |
| 9,548,303 B2 | 1/2017 | Lee et al. |
| 9,601,393 B2 | 3/2017 | Lee et al. |
| 9,607,233 B2 | 3/2017 | Kaizerman et al. |
| 9,865,542 B2 | 1/2018 | Liaw et al. |
| 9,870,443 B2 | 1/2018 | Huang et al. |
| 10,115,040 B2 | 10/2018 | Brauer |
| 10,267,748 B2 | 4/2019 | Plihal et al. |
| 10,338,002 B1 | 7/2019 | Danen et al. |
| 10,713,534 B2 | 7/2020 | Brauer |
| 10,867,108 B2 * | 12/2020 | Chao .................. G03F 7/70616 |
| 2012/0316855 A1 | 12/2012 | Park et al. |
| 2019/0287232 A1 | 9/2019 | Brauer |
| 2019/0302031 A1 | 10/2019 | Plihal et al. |
| 2020/0025689 A1 | 1/2020 | Gaind et al. |
| 2020/0089130 A1 | 3/2020 | Chao |

* cited by examiner

OPTICAL MODE OPTIMIZATION FOR WAFER INSPECTION

PRIORITY

This application is a continuation of U.S. patent application Ser. No. 16/250,128 filed Jan. 17, 2019 which claims priority to U.S. Provisional Patent Application Ser. No. 62/732,813 filed Sep. 18, 2018, and entitled "Optical Mode Optimization for Wafer Inspection," the entire disclosure of which is hereby incorporated herein by reference.

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs. In the course of integrated circuit evolution, functional density (i.e., the number of interconnected devices per chip area) has generally increased while geometry size (i.e., the smallest component that can be created using a fabrication process) has decreased. This scaling down process generally provides benefits by increasing production efficiency and lowering associated costs.

As a part of the IC fabrication process, wafers may be inspected to identify potential defects. Typically, inspection may be done using an optical system but as there are various types of defects that exhibit different optical properties, inspection systems need to carefully tune optical parameters for optimal detection. Existing inspection systems require repetitive inspections of real defects on real wafers in order to optimize the optical parameters. In other words, the inspection is a time-consuming process often with low efficiency. Consequently, although existing inspection systems have been generally adequate for their intended purposes, they have not been satisfactory in all respects.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
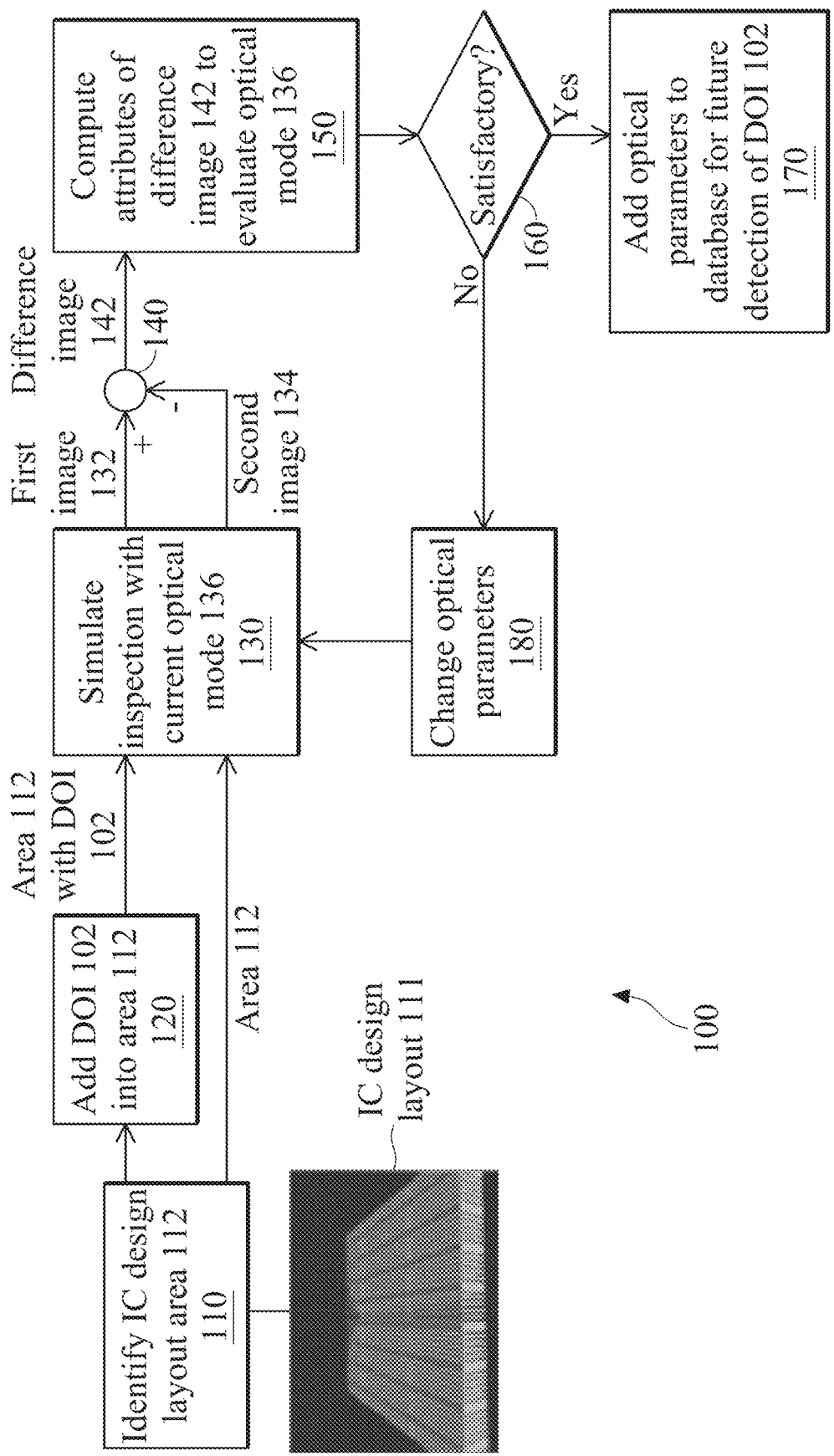
FIG. 1 is a schematic diagram illustrating a method for determining wafer inspection parameters according to various aspects of the present disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the sake of simplicity and clarity and does not in itself dictate a relationship between the various embodiments and/or configurations discussed. Moreover, various features may be arbitrarily drawn in different scales for the sake of simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

The present disclosure is generally related to semiconductor devices and inspection methods thereof, and more particularly to optical mode optimization for wafer inspection.

As a part of the IC fabrication process, wafers undergo inspection to identify potential defects. Inspection is an important part of fabricating semiconductor devices such as ICs. Inspection systems often have adjustable optical parameters such that different optical parameters may be used to detect different defect types or to minimize unwanted signals such as background noise. However, since there are many types of defects that exhibit different optical properties, inspection systems need to carefully tune optical parameters for optimal detection. Current methods for tuning an optical inspection recipe require repetitive inspections of real defects on real wafers in order to determine effective optical parameters. However, such an inspection process is time-consuming if all potential defects generated by the inspection process are to be reviewed. The issue is exacerbated by the fact that an inspection system has multiple categories of optical parameters, each of which has multiple value options. That means the inspection system has many (e.g., close to 100) possible combinations of optical parameter values. Testing all these possibilities on real wafers is inefficient and time-consuming. Further, even if a preferred set of optical parameter has been identified for a particular defect, if fabrication process conditions change (as they often do), the set of optical parameters may no longer work since the defect may have changed in terms of shape and/or location.

The present disclosure solves these issues by optimizing inspection parameters not via inspection of real wafers but via inspection simulation. The inspection simulation allows a user not only to initially identify an optimal set of optical parameters for inspecting a certain defect, but also to adjust or tune the optical parameters should process conditions change. Each set of optical parameters is considered an optical mode. According to some embodiments, to optimize an optical mode for a particular defect of interest (DOI), an inspection system first uses a 3D model of an IC design layout to identify an area therein that surrounds the location of the DOI. An inspection simulation is then performed on the area by generating multiple simulated optical images using multiple candidate optical modes. The simulated optical images are then compared against each other to determine which one represents the best result, and the corresponding optical mode is then selected as the preferred mode. Further, after the initial optimization, the inspection system is capable of monitoring process conditions such that when new DOIs are discovered, the system may be retrained by adjusting values of optical parameters. As a result, the present disclosure allows for optimization of optical parameters without having to test all possible optical modes on real wafers with real defects. The optimized optical parameters may be used for subsequent inspections of similar DOIs and generally do not require much additional tuning, if any. In case tunings are needed, the retrain mechanisms disclosed herein allow for fast tuning of optical parameters to adapt to process condition changes.

FIG. 1 is a schematic diagram illustrating a method 100 for determining wafer inspection parameters according to various aspects of the present disclosure. Method 100 is merely an example, and is not intended to limit the present disclosure beyond what is explicitly recited in the claims. Additional operations can be provided before, during, and after method 100, and some operations described can be replaced, eliminated, or moved around for additional embodiments of method 100.

Method 100 may be used to detect various defects, which may be classified as systematic defects, systematic random defects, and random or nuisance defects. On one hand, systematic defects and systematic random defects are sometimes collectively referred to as "hot spots." Such hot spots may be caused by problems related to circuit design, mask design, or even by the implementation of optical proximity correction (OPC) features. These issues may manifest themselves in every wafer and/or chip. In other words, tuning fabrication process parameters will not reduce or eliminate systematic defects or systematic random defects. As such, it is important to identify the systematic defects or systematic random defects so that corrective actions may be taken to reduce or eliminate these defects from future wafers. For example, modifications may be made to the photomask or the circuit design. On the other hand, random defects or nuisance defects may be attributed to a variety of factors such as unexpected/unforeseen fabrication process variations, contaminant particles, human errors, machine errors, etc. As such, the random defects or nuisance defects cannot be completely eliminated even if circuit or mask designs are optimized. Their occurrence may be unrepeatable and random in nature. For reasons of simplicity, systematic defects and systematic random defects may be referred to herein as hot spots, and random defects and nuisance defects may be referred to herein as nuisance defects. A defect of interest (DOI) is any defect that a wafer inspector is interested in detecting. Both hot spots and nuisance defects may be DOIs during inspection. In some embodiments, DOIs are hot spots whose locations and/or shapes are more predictable than nuisance defects, for example, based on the experience of users.

As part of the wafer inspection process, method 100 optimizes wafer inspection parameters that are to be used for inspecting a potential DOI 102. To start off, at block 110, a portion of an IC design layout 111 is selected as an area of interest (AOI), in short as area 112. In an embodiment, area 112 is selected because empirical data suggest that DOI 102 is likely to occur within area 112. Thus, area 112 may have any suitable size or geometric shape as long as it surrounds DOI 102 and includes pertinent layout information. The size of area 112 is big enough to reflect layout information surrounding DOI 102 but small enough for the inspection system to efficiently process during simulation. In some embodiments, the size of area 112 is about 200×200 square micrometers (um^2) or less (e.g., about 50×50 um^2, or about 10×10 um^2). The IC design layout and area 112 therein may exist in any suitable form. For instance, the IC design layout or area 112 may be a 3D model or layout structure built from a Graphic Data System (GDS) or GDS II file.

Next, two different versions of area 112—one with DOI 102 and the other without DOI 102—are simulated to generate a simulated optical image. Specifically, at block 120, an artificial defect is added to area 112 to represent DOI 102, which is possible to occur within area 112 during wafer fabrication of the IC design layout. The artificial defect is not a real defect on a wafer but is added to area 112 by a user of the inspection system so as to determine the impact of DOI 102 on inspection outputs. DOI 102 may be of any suitable type such as a cut metal failure, a damaged oxide definition fin, a dummy gate or metal gate extrusion, merged metal lines, missing vias, or another type of potential defects. Examples of such defects are further described with respect to FIGS. 3A-3I. In an embodiment, when the artificial defect is added into area 112, relevant information such as the type of DOI 102 and the location of DOI 102 (e.g., 2D or 3D coordinates, either relative or absolute) is specified by the inspection system. A user may know (e.g., based on experience) what type of defect is likely to occur at certain locations of an IC design layout, so the user may input such information into the inspection system.

At block 130, an inspection simulation is performed on area 112 with and without DOI 102. In an embodiment, the inspection simulation is first performed on area 112 with DOI 102 to generate a first image 132, and the inspection simulation is then repeated on the clean version of area 112 to generate a second image 134. Since images 132 and 134 do not depend on each other, they may be generated in any order. Images 132 and 134 may be generated from respective 3D models of area 112. Further, the same optical mode 136 (called a current optical mode) is used on both versions of area 112 in order to properly evaluate the impact of DOI 102.

In practice, an inspection system is capable of operating in various optical settings that are called optical modes. Each optical mode includes a set of optical parameters. In an embodiment, the set of optical parameters include pixel size, optical wavelength, aperture shape, optical polarization, and focus setting. These parameters represent five broad categories of tunable optical properties. Each optical parameter has options of different values (in numbers or ranges). For example, the pixel size may be 10 nm, 20 nm, 50 nm, 100 nm, or any other suitable value. The optical wavelength may be divided into ranges including: ultra-deep band (UDB) which is part of the deep ultraviolet band, middle band (MB), blue band (BL) which is part of the ultraviolet band, IL (about 370 nm), GL (about 430 nm), GHI (IL to GL)) band which is close to visible light, or any other suitable optical wavelength. The aperture shape may be horizontal low sigma (HDIB), edge contrast plus (ECP), vertical low sigma (VDIB), bright field (BF), or any other suitable optical mask aperture. The optical polarization may be horizontal (polarizer 1) none (polarizer 2) (HN) or vertical (polarizer 1) none (polarizer 2) (VN). The focus setting may be −0.2, 0, 0.2 (no unit in the software), or any other suitable value. In some embodiments, pixel size dominates an inspection resolution, spectrum (optical wavelength) has high correction with material and semiconductor structure, aperture shape may separate a background noise and a defect signal, polarization is considered with surface topography, and focus setting or decision is dependent on defect location(s) on a wafer. These five optical parameters also influence each other, so they may be considered together to achieve an optimal set of optical parameters. Since there are five tunable optical parameters, and each optical parameter has various values, the inspection system has many possible combinations of optical parameters values, where each combination may be considered an optical mode. When the inspection system is simulated in a simulation system (either part of the inspection system or a standalone system), the same optical modes may be adopted for analysis and optimization. In this sense, the simulation system also operates in various optical modes.

The inspection simulation continues at block 140, where a difference image 142 is generated by comparing first and second simulation images 132 and 134. In an embodiment, image 132 is subtracted from image 134, or vice versa, to generate difference image 142. In this case, difference image 142 is the simulated optical image. Note that, since the simulated optical image represents an optical image of area 112 generated by the inspection simulation process, any suitable representation of area 112 with DOI 102 may be used as the simulated optical image as long as its quality can be properly evaluated. For instance, instead of using difference image 142, in some embodiments first image 132 may be directly used as the simulated optical image since it is generated from area 112 with DOI 102 (in which case block 140 may be omitted).

A simulation system may use any suitable algorithms to perform an inspection simulation on area 112. In an embodiment, the simulation system is based on finite-difference time-domain (FDTD) equations to solve Maxwell boundary conditions of area 112. The simulation system may consider reflective light, as opposed to optical proximity correction (OPC)—related FDTD applications which may consider only transmit light. The simulation system may also use the convolutional perfectly matched layer (CPML) absorption boundary condition as part of the simulation algorithm. The simulation system may also utilize near-structure detectors with incident light filtering technology.

At block 150, one or more attributes of difference image 142 are computed or otherwise determined as measures to evaluate the performance of optical mode 136. The attributes may help determine whether difference image 142 allows an inspection system to identify the existence (or nonexistence) of DOI 102. Various predefined attributes may be used for evaluating optical mode 136. For example, the predefined attributes include the number of defects that can be detected as well as the strength of detection signals. In some embodiments, the inspection system uses a multi-die adaptive threshold (MDAT) algorithm, which may calculate various attributes that describe the relations between defect and background signals. In this case, the predefined attributes may include an MDAT signal, an MDAT noise, an MDAT offset signal that accounts for a weighted difference between the MDAT signal and the MDAT noise, or a signal to noise (S/N) ratio that accounts for a ratio between the MDAT signal and the MDAT noise, or combinations thereof. In some embodiments, the attributes may depend on the type of DOI 102 being targeted. For instance, if DOI 102 is missing via(s), the attributes may include the number of detected missing vias.

Since the attributes of difference image 142 are detectable by the inspection system, such attributes may be considered defect detection signals used for the evaluation of optical mode 136. In this case, one or more defect detection signals are generated from the simulated optical image (e.g., difference image 142) for evaluating optical mode 136 against other optical modes. A defect detection signal may be directly generated from difference image 142 (e.g., an MDAT signal or an MDAT noise). A defect detection signal may also be indirectly generated from difference image 142 (e.g., an MDAT offset or a signal to noise ratio). In some embodiments, when two optical modes are being evaluated, one or more first defect detection signals are generated from a first simulated optical image, which had been generated using a first optical mode. Similarly, one or more second defect detection signals are generated from a second simulated optical image, which had been generated using a second optical mode. Then, the first and second optical modes are evaluated by comparing the first and second defect detection signals. Details of the evaluation process are further described with respect to FIG. 3A-3I.

At block 160, method 100 determines whether optical mode 136 generates the best or otherwise satisfactory attributes. If yes, method 100 may proceed to block 170, where optical mode 136 is selected as a preferred mode for future inspection of DOI 102 in area 112. Optical mode 136 is saved in a database (called a defects bank or library). Otherwise, if optical mode 136 generates unsatisfactory results (e.g., not better than previously tested optical modes), method 100 may proceed to block 180, where one or more optical parameter values of optical mode 136 are changed. For instance, the pixel size, optical wavelength, aperture shape, optical polarization, and focus setting, or combinations thereof may be changed. At this point, optical mode 136 changes into a new optical mode (which may also be considered a revised optical mode 136).

After changing one or more values of the optical parameters at block 180, method 100 returns to block 130, where the inspection simulation is repeated on area 112, with and without DOI 102, using the new optical mode (or the revised optical mode 136). Similar to descriptions above, a new difference image is generated, and then attributes of the new difference image are computed for evaluating the new optical mode against the original optical mode 136. In some embodiments, corresponding attributes of the two difference images are compared against each other when two optical modes are being evaluated. After comparison, the optical mode that generates better attributes (based on predefined criteria) is selected as the preferred optical mode for future inspection of DOI 102 in area 112. This optical mode is then added to the defects bank, which stores information relevant to defects such as defect shapes, locations, and surroundings. In an embodiment, certain blocks of method 100 (e.g., blocks 130, 140, 150, 160, and 180) may be repeatedly executed until a preferred optical mode is identified or until optical mode 136 generates satisfactory results. The preferred optical mode is sometimes called a best known method (BKM) mode.

In some embodiments, some blocks of method 100 are manually performed by a user of the optical inspection system. For example, method 100 may generate a set of attributes from each optical mode, and then offers multiple sets of attributes for the user to decide which optical mode works best. The inspection system may select a few promising optical modes and present them as candidates for final selection by the user.

Various suitable techniques may be used to optimize the optical mode. In some embodiments, values of the same optical image attributes, which have been computed from images of different optical modes, are compared against each other to determine which optical mode generates relatively better attributes. In an embodiment, attribute values such as S/N ratios are directly compared, and the optical mode resulting in the highest S/N ratio is selected as the best optical mode. Alternatively, each attribute value may be ranked according to a ranking system, and the highest ranked attribute value may correspond to the best optical mode. In some embodiments, multiple attributes of simulated optical images are evaluated in a comprehensive manner. For example, a first simulated optical image may be better than a second simulated optical image in terms of a first attribute, but may be worse than the second simulated optical image in terms of a second attribute. In this case, first and second attributes may be evaluated together (e.g., with more weight given to the more important attribute) to determine which simulated optical image produces overall better attributes.

In some embodiments, artificial intelligence (AI) algorithms, such as machine learning, deep learning, random forest, and/or mixed model algorithms are used to select the optimal optical mode. Such AI algorithms help the inspection system to identify BKM modes more efficiently, for example, by learning from past comparisons and by offering suggestions or recommendations to a user of the optical inspection system. More details of the AI algorithms are described below with reference to FIG. 2B.

Once a preferred optical mode has been identified using method 100, the preferred optical mode may be used to inspect a certain DOI for a long time, provided that fabrication process conditions do not change significantly. However, sometimes fabrication process conditions do change, which may impact the formation of DOIs on wafers. For example, the location and/or type of DOIs may change. As a result, a preferred optical mode may lose its effectiveness over time. Therefore, a retrain mechanism is disclosed herein to help maintain the effectiveness of the inspection system.

Figure 2A:
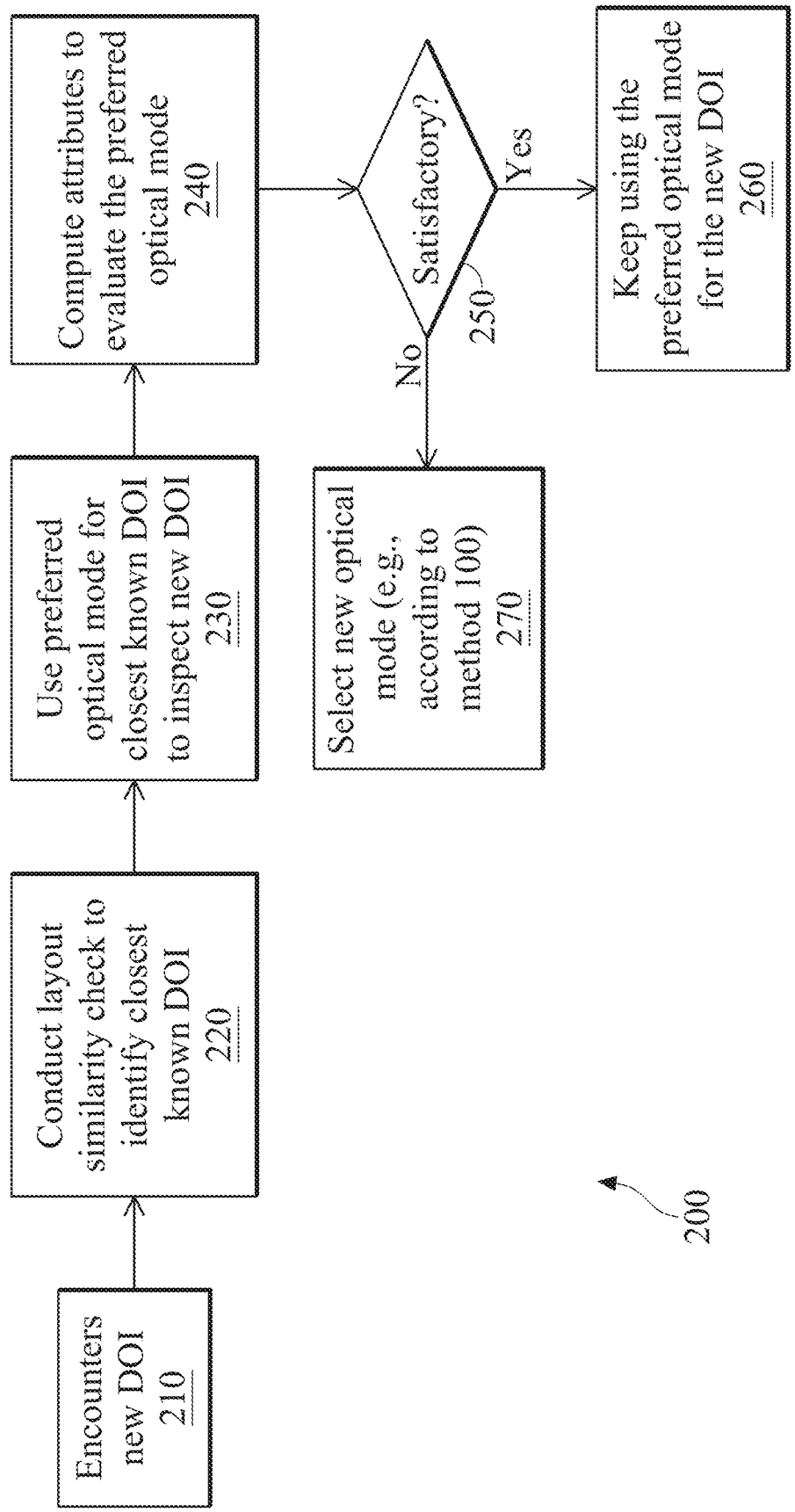
FIG. 2A is a schematic diagram illustrating a method for retraining wafer inspection parameters according to various aspects of the present disclosure.

FIG. 2A is a schematic diagram illustrating a method 200 for retraining wafer inspection parameters according to various aspects of the present disclosure. Like method 100, method 200 is merely an example, and is not intended to limit the present disclosure beyond what is explicitly recited in the claims. Additional operations can be provided before, during, and after method 200, and some operations described can be replaced, eliminated, or moved around for additional embodiments of method 200.

Method 200 may be used in conjunction with method 100 to detect various defects. To start off method 200, at block 210, an inspection system encounters a potentially new DOI. The new DOI may be a new type of DOI at a known location, a known type of DOI at a new location, or a new type of DOI at a new location. At block 220, the inspection system may conduct a layout similarity check to identify a known DOI that is closest to the new DOI (in terms of type, location, or both). As described above, the known DOI has a preferred optical mode associated therewith. The layout similarity check may use any suitable algorithms to compare DOIs. After identifying the known DOI, at block 230 the inspection system may use the preferred optical mode for the known DOI to inspect the new DOI. Any suitable inspection mechanisms may be used. At block 240, one or more attributes or defect detection signals are computed or otherwise determined to evaluate the preferred optical mode (specifically, the set of optical parameters contained therein). Depending on the DOI, any suitable attributes may be used. At block 250, method 200 determines, based on the attributes, whether the preferred optical mode passes or fails predefined criteria. For example, each attribute value may be ranked according to a ranking system, and any rank that is lower than a threshold rank is deemed to have failed the criteria. For another example, each attribute value may be accorded a score, and a passing score may be assigned. Multiple attributes may be considered in a combined manner as well. If, at block 250, the preferred optical mode passes predefined criteria, method 200 proceeds to block 260, where the inspection system adopts the preferred optical mode for future inspections of the new DOI. The new DOI may be added to the defect bank. Otherwise, if the preferred optical mode fails predefined criteria, method 100 proceeds to block 270, where the initial process of identifying a preferred optical mode would be repeated, as described with respect to method 100. In that process, the optical mode is changed, for example, by modifying the values of one or more optical parameters. After block 260, a new optical mode is selected for inspection of the new DOI, and relevant information is added to the defect bank.

As described above, a defect bank initially stores information obtained from method 100, including optical modes, defect types, locations, and surrounding layout information. The initial defect may further include empirical data obtained from prior inspections. As more defects are identified in continuous use of the inspection system, information regarding new defects may be incorporated into the defect bank. If the defect bank has an optimal optical mode for one defect, but several new defects have been found where this mode no longer works well (e.g., due to change in process conditions), the inspection system has machine learning capabilities to establish new modes.

Figure 2B:
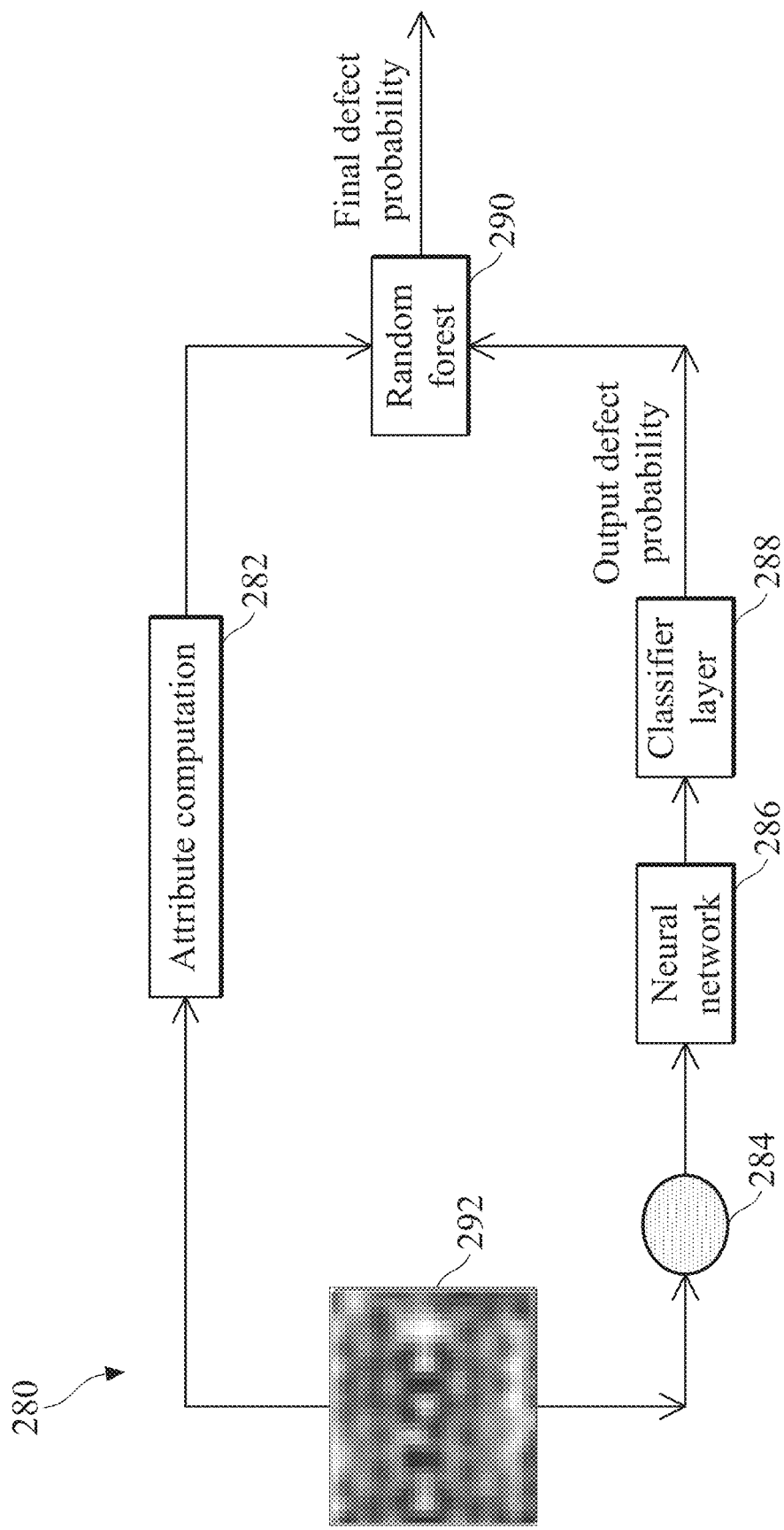
FIG. 2B is a schematic diagram illustrating an example artificial intelligence (AI) structure for optimizing optical parameters according to various aspects of the present disclosure.

As described above, in some embodiments, artificial intelligence (AI) is used to help select the optimal optical mode. FIG. 2B is a schematic diagram illustrating an example AI structure 280 according to various aspects of the present disclosure. AI structure may be implemented as part of method 100 and/or method 200. As shown in FIG. 2B, AI structure 280 may comprise attribute computation module 282, training set 284, neural network 286, classifier layer 288, and random forest module 290. In some embodiments, optical image 292 is fed into AI structure 280 and received by attribute computation module 282 and training set 284 in parallel. On the one hand, attribute computation module 282 may calculate attributes of optical image 292 such as defect signal, noise signal, and defect topology information, etc. For instance, attributes including MDAT gray level (GL), MDAT offset, and defect size may be determined according to method 100 described above. On the other hand, training set 284 may provide suitable images to optical image 292 for comparative analysis. Training set 284 may provide patch images from real defects, which contain different defect types that occurred before in different process layers. The image may be processed by neural network 286 (e.g., a resnet 18 network) to generate attributes. In some embodiments, neural network 286 includes at least one convolution layer and/or a depth-wise separable convolution layer for computing attributes. Sometimes there may be a large set of attributes, in which case classifier layer 288 may determine and select best attributes for additional analysis. In an embodiment, classifier layer 288 may include at least one fully connected (FC) layer for attributes selection. Classifier layer 288 may be implemented as multiple stages, each of which may reduce the number of attributes by half (e.g., from 256 to 128, from 128 to 64, etc.). Classifier layer 288 may determine and output a defect probability (embedded with other attributes), which may be connected to random forest module 290 to output a final defect probability. Therefore, random forest module 290 mixes or combines both outputs of computation module 282 and classifier layer 288 in generating the final defect probability. The final defect probability may then be used to determine the detectability of a defect (e.g., a probability of one means detection, while a probability of zero means no detection). Thus, the final defect probability may be used in method 100 or 200 to help optimize or retrain the optical modes. The upper portion of AI structure 280 containing attribute computation module 282 is sometimes called a machine learning portion, while the lower portion of AI structure 280 containing training set 284, neural network 286, and classifier layer 288 may be called a deep learning portion. Optical image 292 may represent a simulated optical image (e.g., when AI structure 280 is used for optical mode optimization) or an actual inspection image (e.g., when AI structure 280 is being trained based on a database which includes many real known defects on real wafers, in which case the output defect probability may determine effectiveness of AI structure 280). Overall, AI structure 280 may help optimize optical modes using the final defect probability.

Figure 3A:
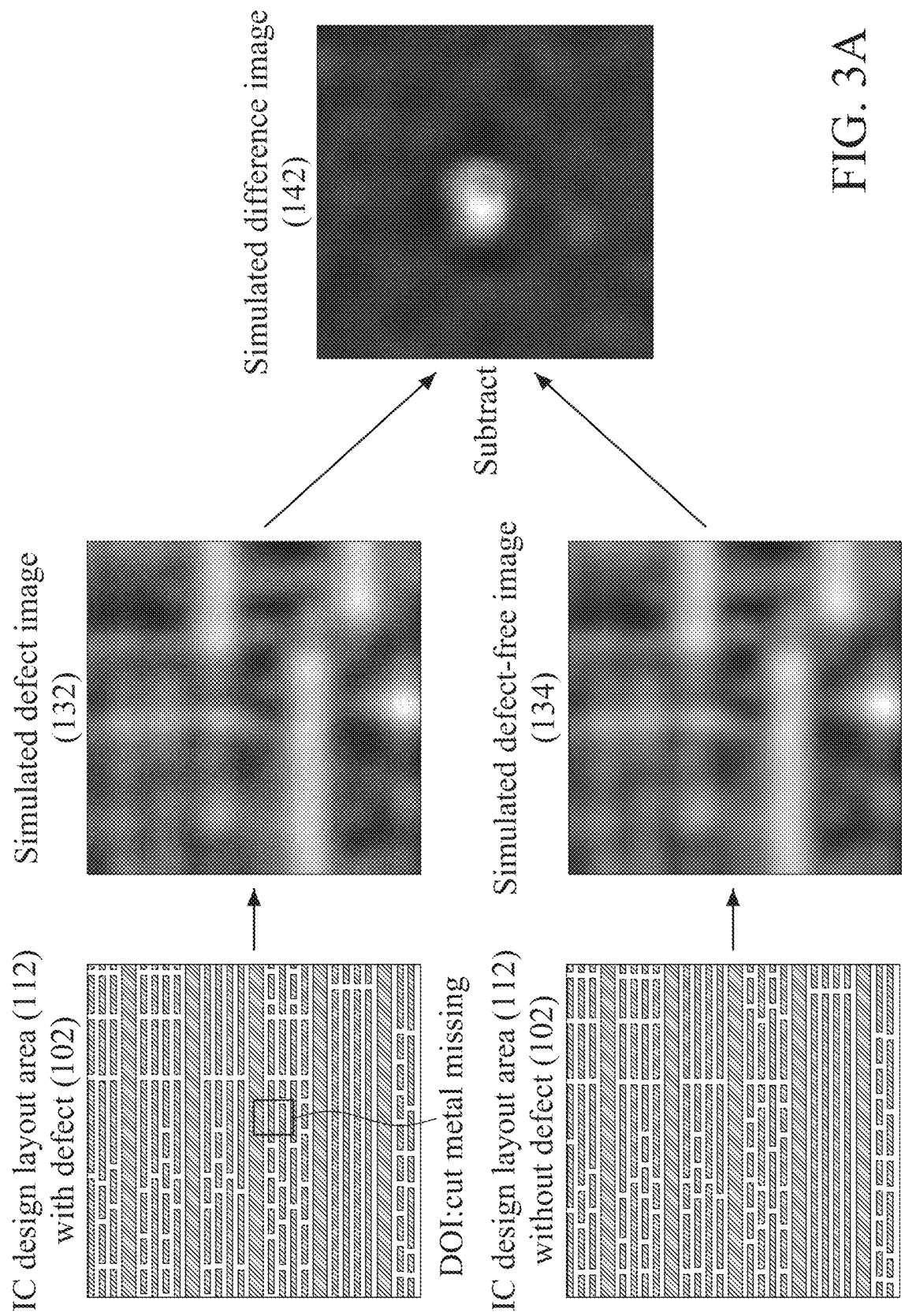
FIGS. 3A, 3B, 3C, 3D, 3E, 3F, 3G, 3H, and 3I illustrate simulation cases that demonstrate the evaluation and selection of optical parameters for different types of defects.

FIGS. 3A-3I illustrate several simulation cases that demonstrate the evaluation and selection of optical parameters for different types of DOIs (e.g., using method 100 and/or 200). FIG. 3A uses an example DOI to illustrate basic concepts involved in the disclosed inspection simulation. The example DOI in FIG. 3A is a cut metal failure, where a section of a cut metal is missing. The DOI is located in an example area 112 with a size of about 2×2 um^2. A first version of area 112 has DOI 102 (which may be added to a 3D model of area 112), while a second version of area 112 does not have DOI 102. The inspection simulation is performed on the first version of area 112 to generate simulated defect image 132, and the same inspection simulation is performed on the second version of area 112 to generate simulated defect image 134. The same optical mode is used on both versions of area 112 during the inspection simulation. Image 132 is subtracted from image 134, or vice versa, to generate difference image 142. Difference image 142 is the simulated optical image on which various attributes may be computed to evaluate the current optical mode. As described above, multiple optical modes may be tested and compared in the process of identifying a preferred optical mode.

Figure 3B:
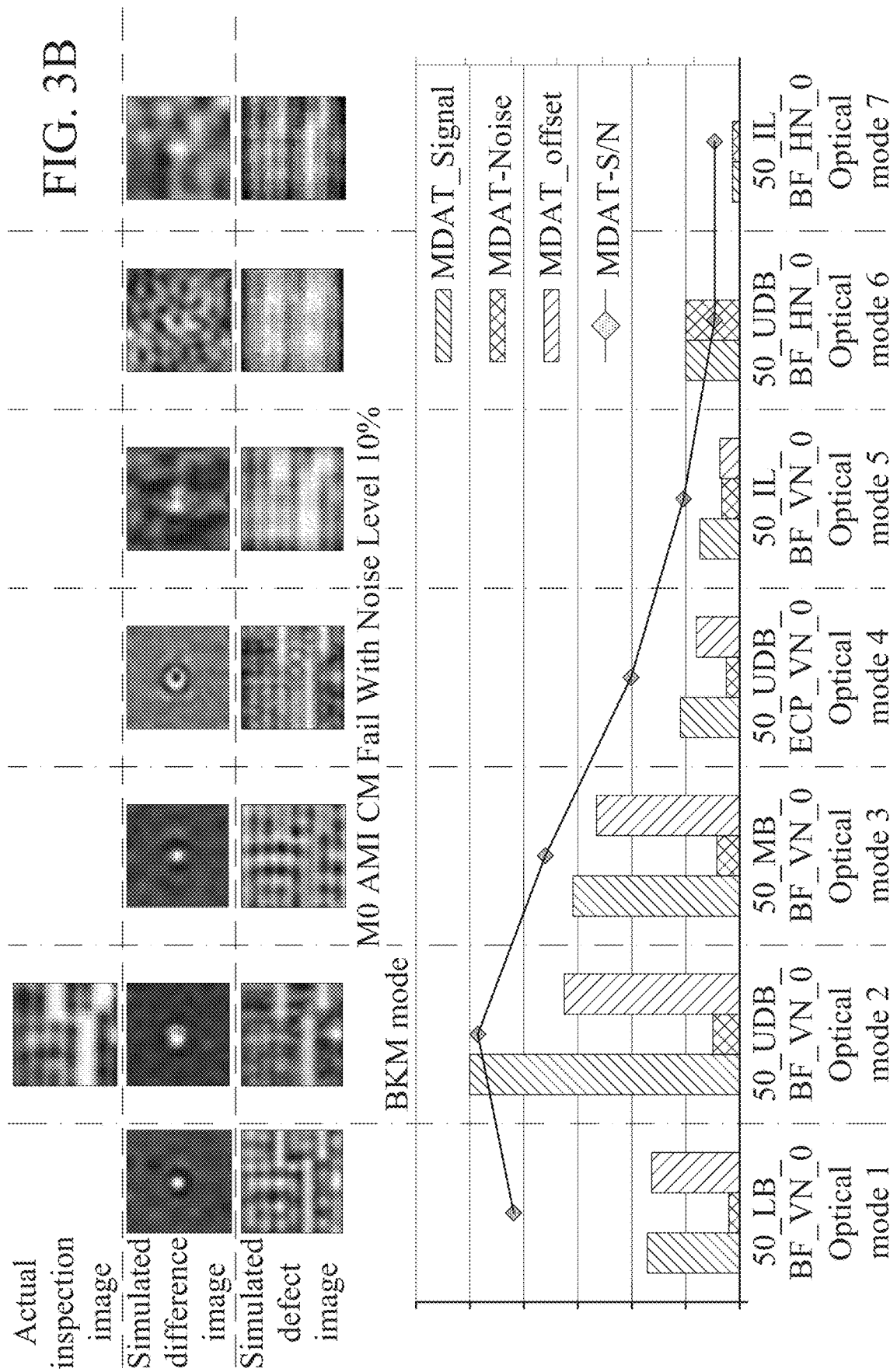

FIG. 3B illustrates seven simulation tests where seven different optical modes are used to simulate the same area 112 as shown in FIG. 3A. Each optical mode has at least one optical parameter value that differs from other optical modes. As noted in the diagram of FIG. 3B, optical mode 1 uses a pixel size of 50 nm, a wavelength range of LB, an aperture shape of BF, a polarization of VN, and a focus of 0. Optical mode 2 is the same as optical mode 1, except that it uses a wavelength range of UDB. Optical mode 3 is the same as optical mode 1, except that it uses a wavelength range of MB. Optical mode 4 is the same as optical mode 2, except that it uses an aperture shape of ECP. Optical mode 5 is the same as optical mode 1, except that it uses a wavelength range of IL. Optical mode 6 is the same as optical mode 2, except that it uses a polarization of HN. Lastly, optical mode 7 is the same as optical mode 5, except that it uses a polarization of HN. Further, the noise level is set to 10% in the simulations unless otherwise noted.

Each optical mode generates a corresponding defect image (shown in FIG. 3B) and a corresponding defect-free image (not shown in FIG. 3B), which are then used to generate a corresponding difference image (shown in FIG. 3B). Predefined attributes—including an MDAT signal, an MDAT noise, an MDAT offset signal (which may or may not be a mathematical difference between the MDAT signal and the MDAT noise), and an MDAT S/N ratio—are computed for each difference image. For instance, optical mode 2 an MDAT S/N ratio (=MDAT signal/MDAT noise) of about 9.7. Corresponding attributes of the seven optical modes are compared against each other. As illustrated in FIG. 3B, optical mode 2 generates the highest MDAT S/N ratio among the seven optical modes, and therefore is determined to be the optimal optical mode. To verify the effectiveness of optical mode 2, an actual wafer with an actual DOI (as illustrated in FIG. 3A) has been inspected using optical mode 2, and the actual inspection image is shown in FIG. 3B. The actual inspection image, which resembles the simulated defect image of optical mode 2, has allowed for identification of the actual DOI. Therefore, the optical mode selection scheme disclosed herein proves to be an effective tool in identifying the DOI.

Figure 3C:
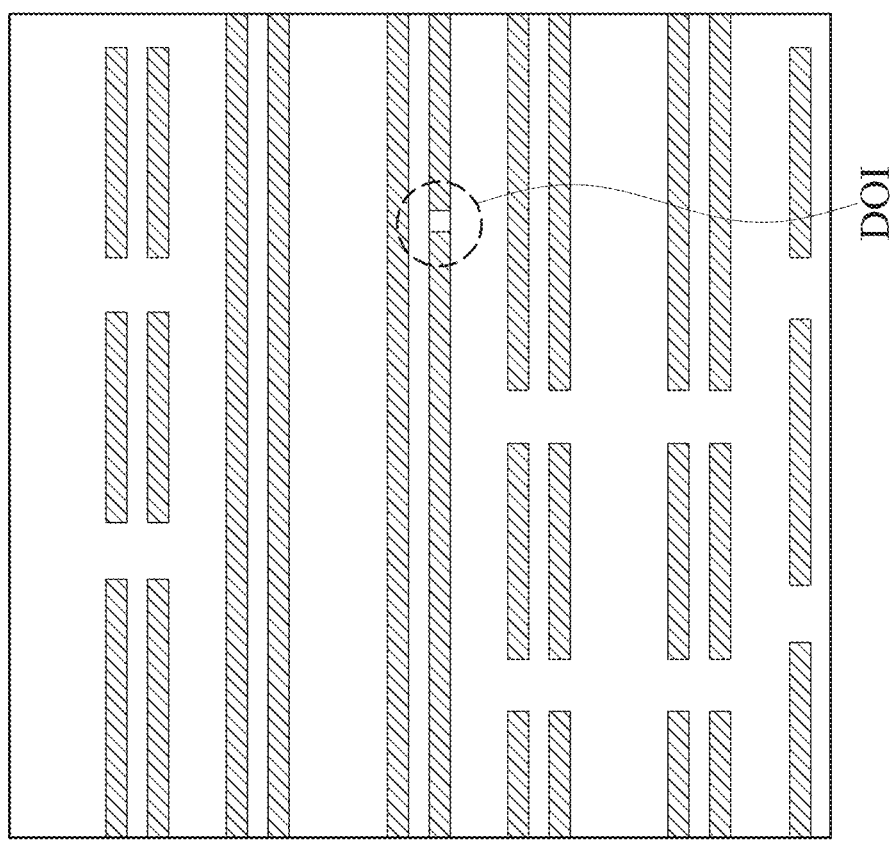
Figure 3D:
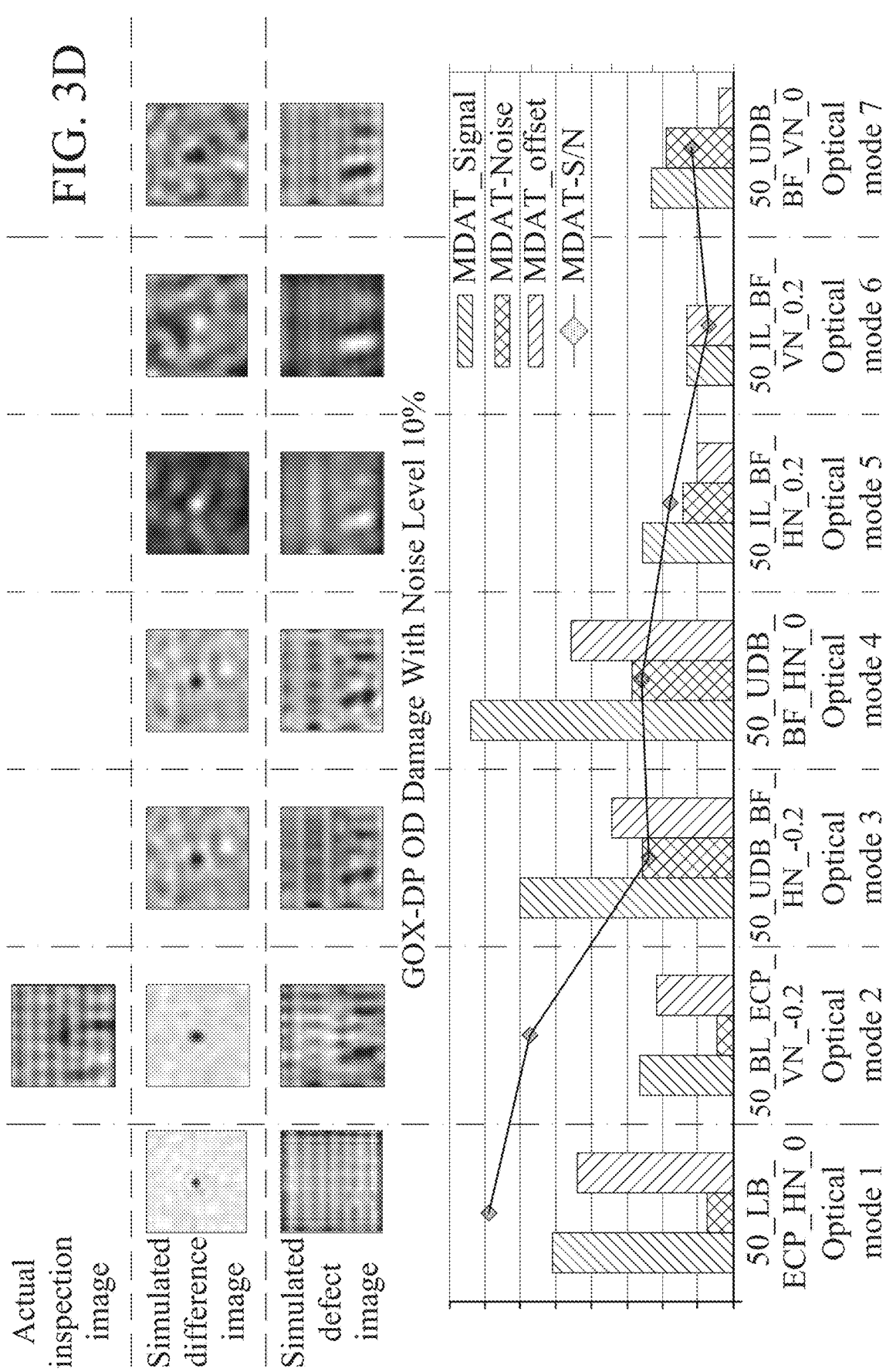

FIG. 3C illustrates an IC design layout area with a different type of DOI, and FIG. 3D illustrates seven simulation tests where seven different optical modes are used to simulate the area shown in FIG. 3C. The example DOI in FIG. 3C is a damaged oxide definition fin. Various aspects of FIG. 3D are similar to that of FIG. 3B, and such similar aspects are not further elaborated in the interest of conciseness. Each optical mode has at least one optical parameter value that differs from other optical modes. The optical parameter values of each optical mode are illustrated in the diagram of FIG. 3D. In some embodiments, multiple attributes of simulated optical images are evaluated in a comprehensive manner. For example, as shown in FIG. 3D, optical mode 1 leads to the best MDAT S/N ratio, but optical mode 2 leads to the lowest MDAT noise level, while optical mode 4 leads to the highest MDAT signal strength. Therefore, depending on the evaluation standard, each of these optical modes has its own benefits. Further, an optimal mode for fabrication (e.g., optical mode 2) may be different from an optimal mode for research & development (e.g., optical mode 4) due to different evaluation standards (e.g., research & development may favor MDAT signal strength, while fabrication may favor the MDAT S/N ratio). In some embodiments, instead of directly selecting a preferred optical mode, the simulation system may offer several optical modes to a user for selection of the preferred mode. FIG. 3D shows that the top three optical modes in terms of MDAT S/N ratio are: optical modes 1, 2, and 4. Each of these top modes may be a viable option.

Figure 3E:
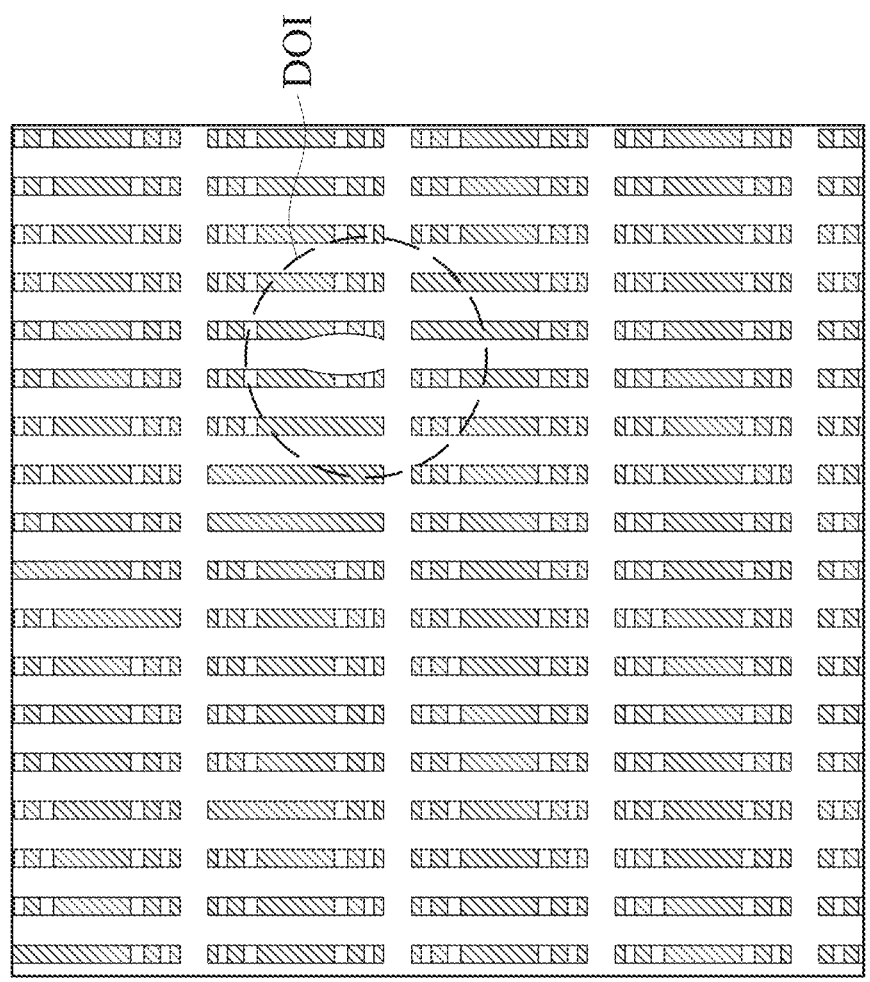
Figure 3F:
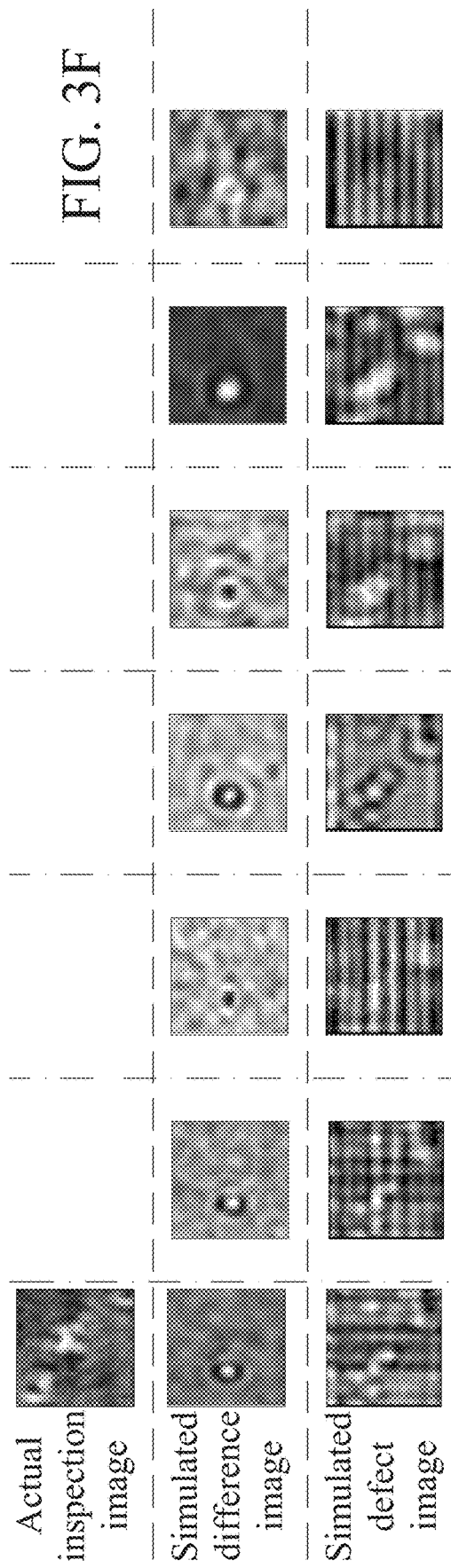
Figure 3F:
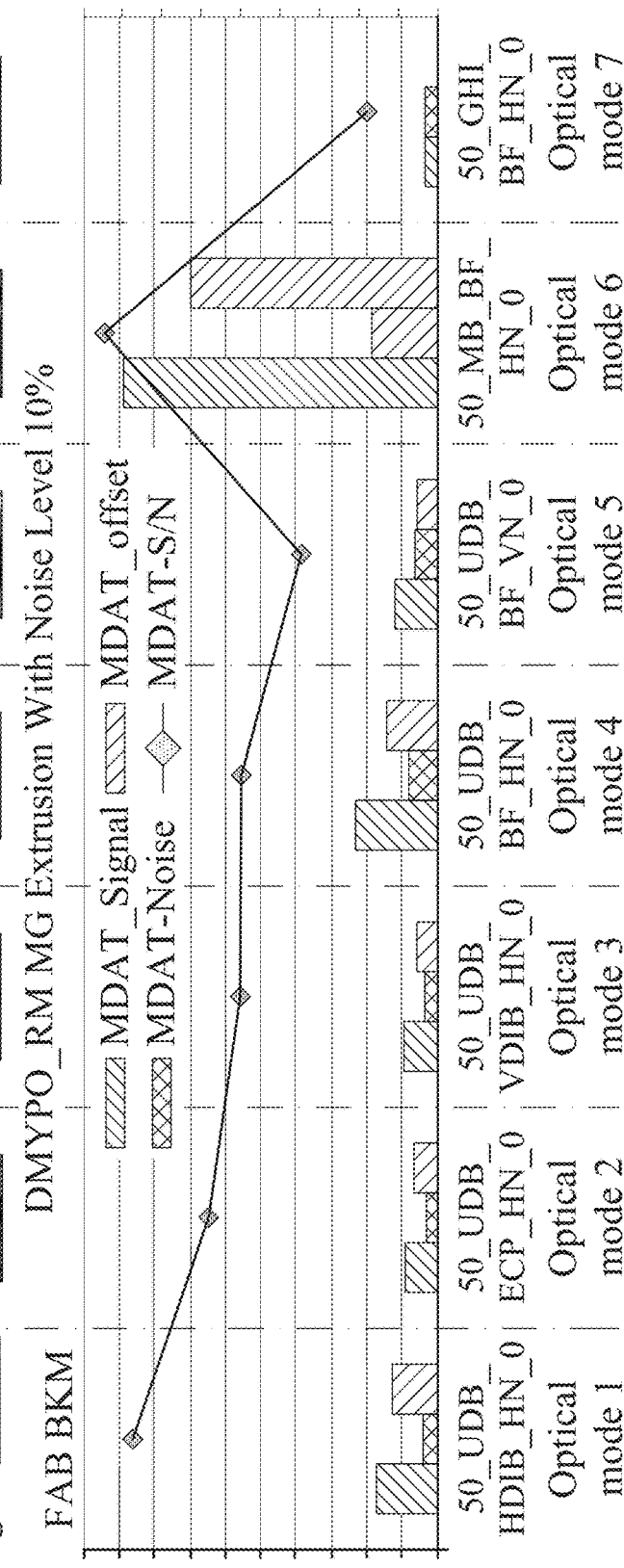

FIG. 3E illustrates an IC design layout area with another different type of DOI, and FIG. 3F illustrates seven simulation tests where seven different optical modes are used to simulate the area shown in FIG. 3E. The example DOI in FIG. 3E is one or more dummy gate or metal gate extrusions. Various aspects of FIG. 3F are similar to that of FIG. 3B, and such similar aspects are not further elaborated in the interest of conciseness. Each optical mode has at least one optical parameter value that differs from other optical modes. The optical parameter values of each optical mode are illustrated in the diagram of FIG. 3F. In some embodiments, the simulation system may offer several optical modes to a user for selection of the preferred mode. FIG. 3F shows that the top three optical modes in terms of MDAT S/N ratio are: optical modes 1, 2, and 6. Therefore, each of these three modes may be a viable option. Further, among these candidates, optical mode 2 leads to the lowest MDAT noise level, optical mode 6 leads to the highest MDAT signal strength and the highest MDAT S/N ratio, and optical mode 1 leads to intermediate values for all of these attributes. Therefore, depending on the evaluation standard, each of these optical modes has its own benefits. In an embodiment, optical mode 1 is selected as a preferred mode for inspecting the DOI shown in FIG. 3E.

Figure 3G:
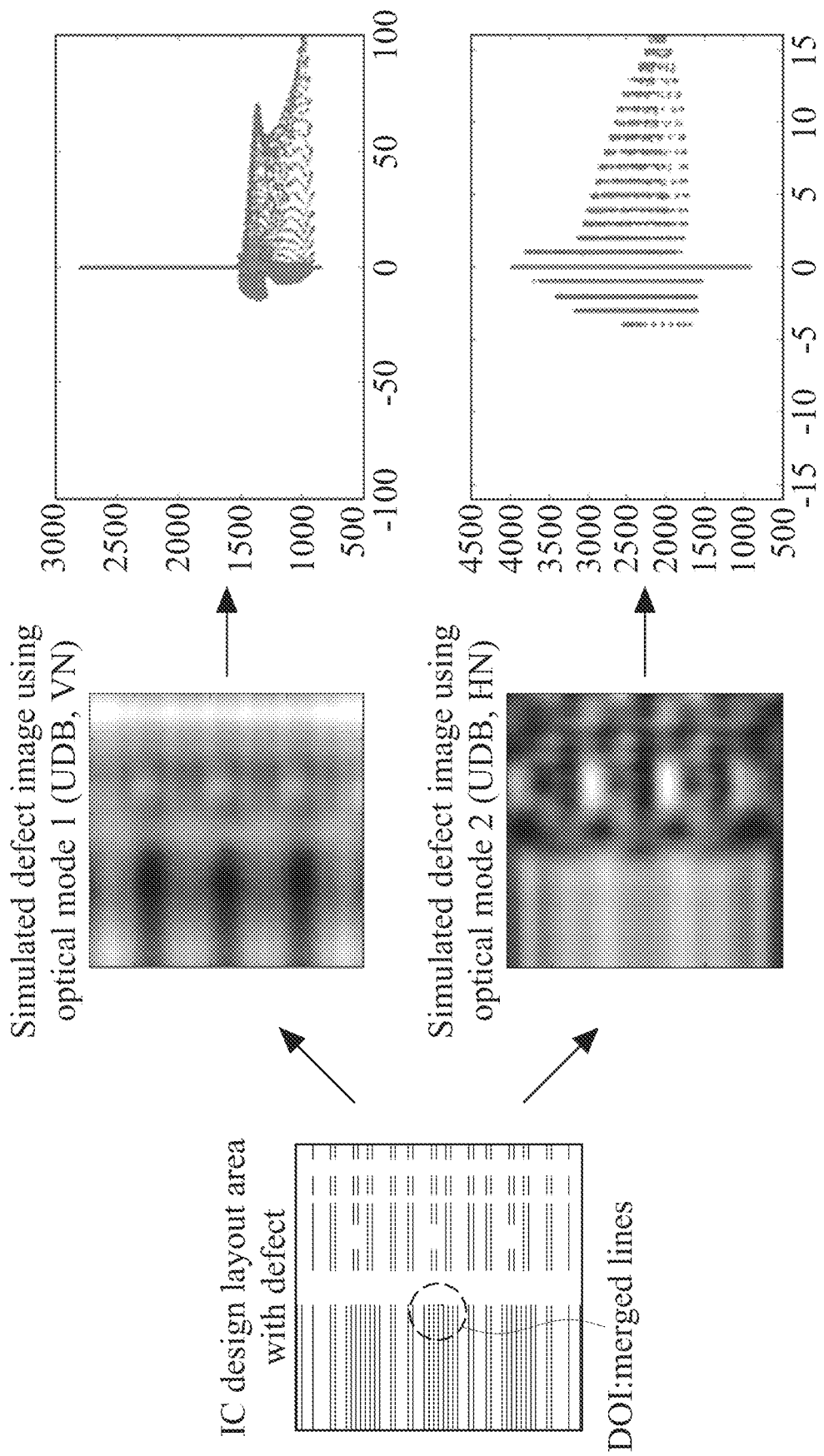

FIG. 3G illustrates an IC design layout area with another different type of DOI, where two different optical modes are used to simulate the area shown in FIG. 3G. The example DOI in FIG. 3G is an unintended merging of metal lines. The two optical modes both use UDB as their optical wavelength, but one simulation uses VN polarization while the other uses HN polarization. Two simulated defect images are generated from optical modes 1 and 2, respectively. As shown in FIG. 3G, attributes are computed from the two images, where the vertical axis represents an MDAT gray level, and the horizontal axis represents an MDAT offset (bigger value indicates better result). A comparison of the two diagrams in FIG. 3G reveals that, since the VN polarization leads to higher attribute values than the HN polarization, the VN polarization preferable over the HN polarization for inspecting the type of DOI shown in FIG. 3G.

Figure 3H:
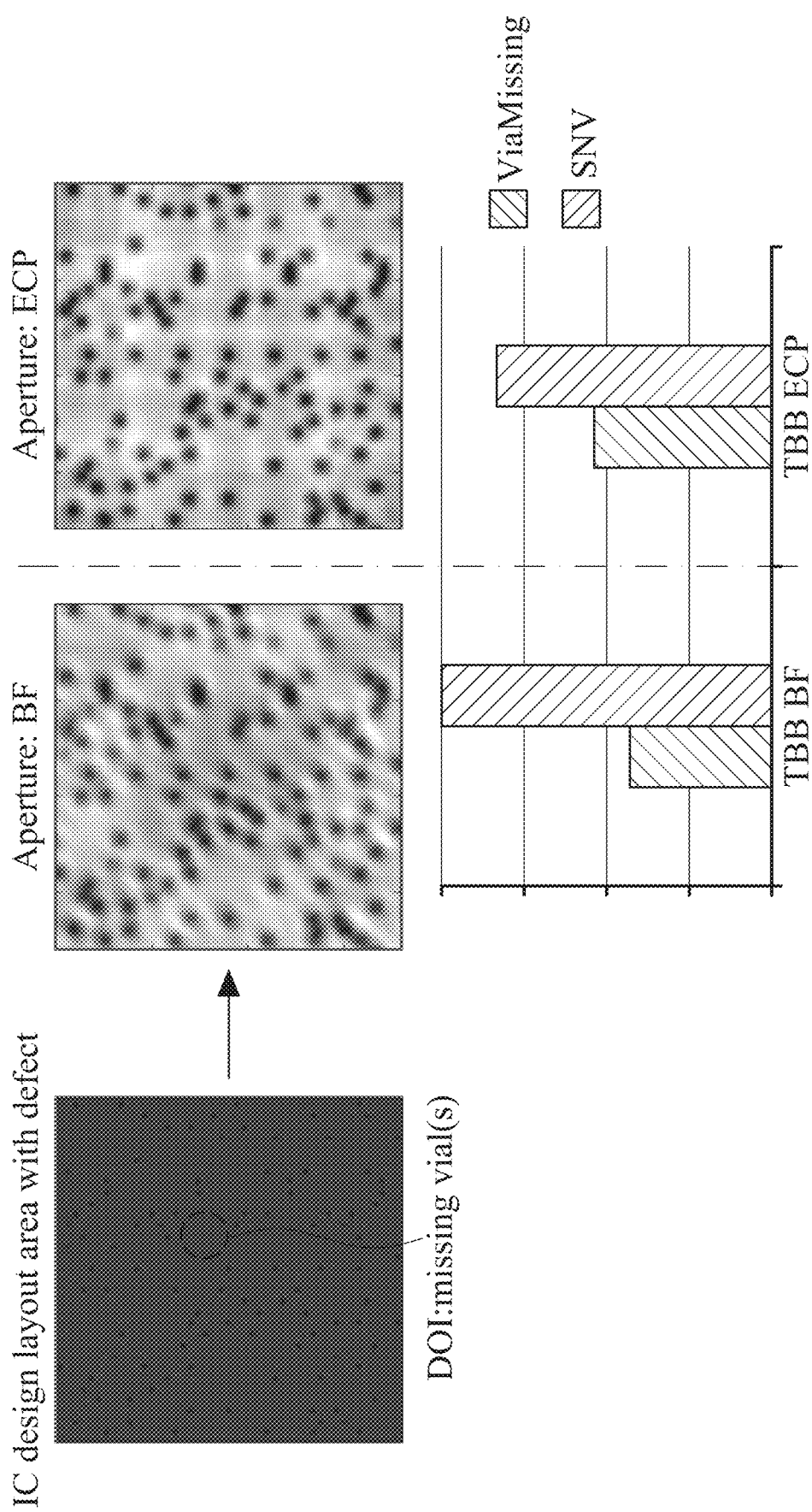

FIG. 3H illustrates an IC design layout area with another type of DOI, where two different optical modes are used to simulate the same area shown in FIG. 3H. The example DOI in FIG. 3H is missing via(s). The two optical modes use the same optical parameters except that one simulation uses an aperture shape of ECP while the other uses an aperture shape of BF. Two simulated defect images are generated from the two optical modes, respectively. In this case, one helpful attribute is the number of missing vias that can be detected and a noise signal level (denoted as SNV). A comparison of the two diagrams in FIG. 3H reveals that, since ECP leads to a higher number of detected missing vias and a lower noise signal level than BF, the aperture shape of ECP is preferable over the aperture shape of BF for inspecting the type of DOI shown in FIG. 3G.

Figure 3I:
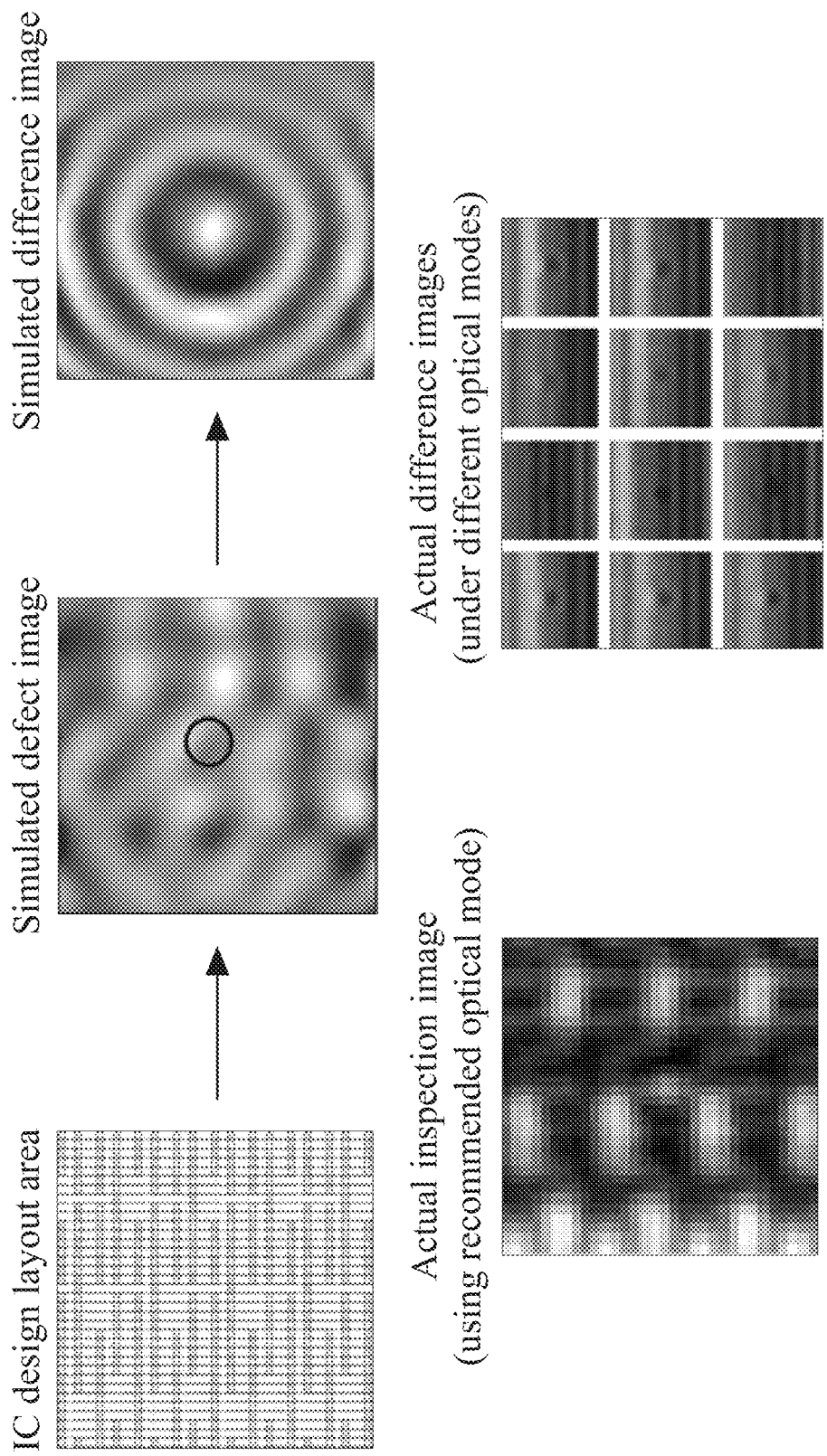

FIG. 3I illustrates an IC design layout area with another type of DOI, where two different optical modes are used to simulate part of the area shown in FIG. 3I. The example DOI in FIG. 3I is a dummy gate or metal gate extrusion, which may occur at the middle end of line (MEOL). As described above, a predefined optical mode generates a simulated defect image (shown in FIG. 3I) and a defect-free image (not shown in FIG. 3I), which are then used to generate a difference image (shown in FIG. 3I). Interestingly, the difference image reveals ripple-like patterns, which are representative for the type of DOIs shown in FIG. 3I. Such unique patterns may help an inspection system identify the type of DOIs shown in FIG. 3I. To verify the effectiveness of the simulation, an actual inspection image of an actual wafer with this type of DOI has been tested. As shown in FIG. 3I, the ripple-like patterns indeed appear in difference images. Further, the ripple-like patterns are clearer in certain modes than other modes. Through the optical mode optimization schemes disclosed herein, an optimal optical mode may be identified to make the ripple-like patterns as clear as possible in order to maximize the chances of detecting the type of DOI shown in FIG. 3I.

As disclosed herein, the embodiments of the present disclosure allow for optimization of optical parameters without having to test all possible optical modes on real wafers with real defects. The optimized optical parameters may be used for subsequent inspections of similar DOIs and generally do not require much additional tuning, if any. In case tunings are needed, the retrain mechanisms disclosed herein allow for fast tuning of optical parameters to adapt to process condition changes. As a result, the embodiments disclosed herein save time and increase efficiency of wafer inspection systems.

Figure 4:
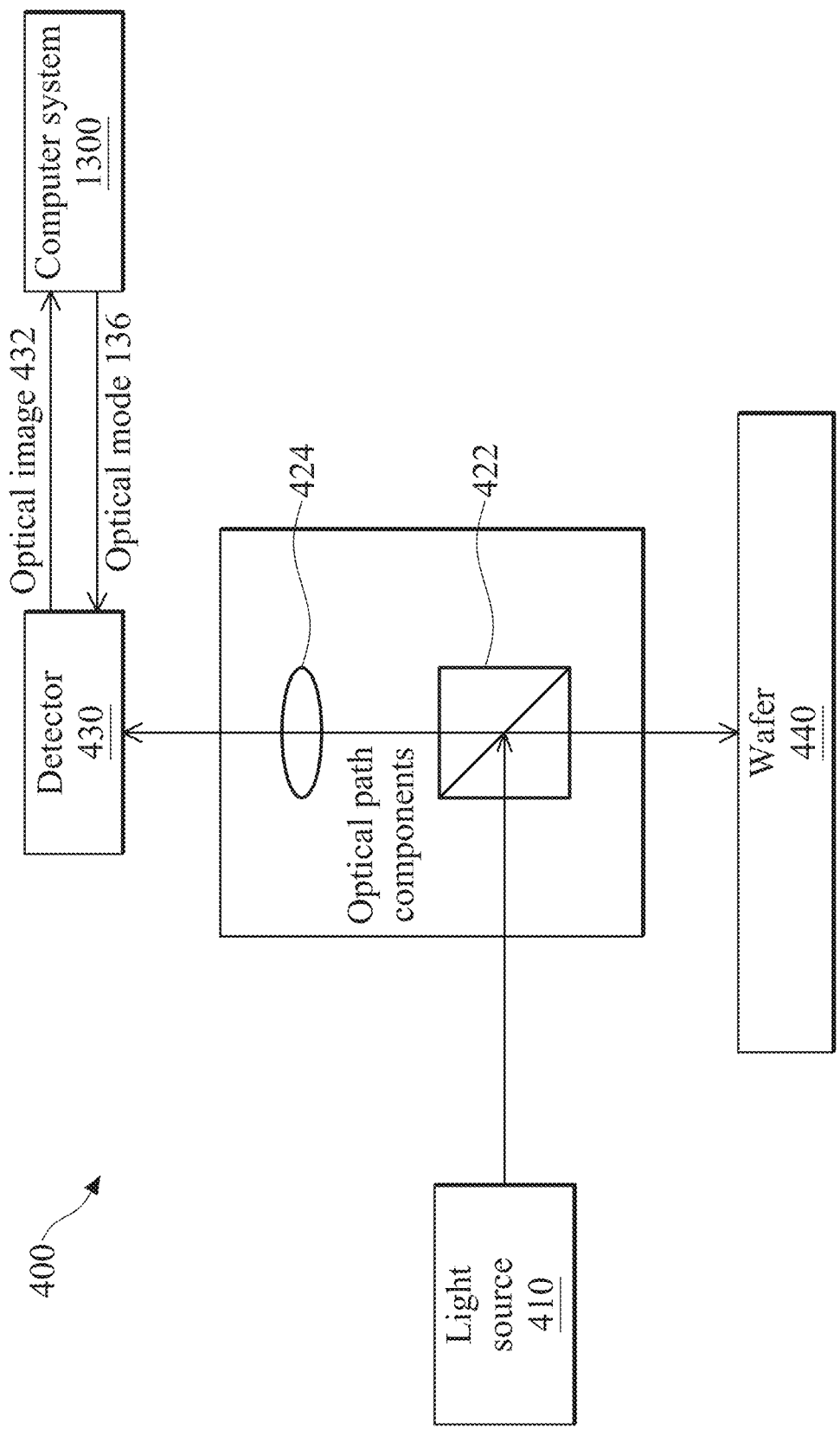
FIG. 4 is a block diagram of an inspection system capable of implementing the various disclosed methods according to various aspects of the present disclosure.

FIG. 4 is a block diagram of an inspection system 400 suitable for implementing various methods described herein, for example, method 100 or 200. Inspection system 400 includes an optical system, which in turn includes a light source 410, one or more optical path components such as a beam splitter 422 and a lens 424, and an optical signal detector 430. The optical system uses light to perform an optical inspection on a wafer 440 in order to identify potential defects located thereon. In an embodiment, light from light source 410 may be directed to beam splitter 422, which may be configured to direct the light from light source 410 to wafer 440. Light source 410 may be implemented in any suitable manner to generate optical energy of any suitable wavelength or wavelength range. The optical path components may include any other suitable elements (not shown) such as various types of lenses, apertures, filters, polarizing components, etc. The light may be directed to any area on wafer 440 at any suitable angle of incidence. Inspection system 400 may scan the light over wafer 440 in any suitable manner. Light reflected from wafer 440 may be collected and detected by detector 430. In an embodiment, light reflected from wafer 440 may pass through beam splitter 422 to lens 424. Lens 424 may include a refractive optical element, and light collected by lens 424 may pass to detector 430. Detector 430 may include any suitable detector such as a charge coupled device (CCD) or another type of imaging detector.

Wafer 440 is fabricated based at least in part on an IC design layout using any suitable fabrication methods and processes. Wafer 440 includes various structures and layers fabricated on a substrate. Any suitable substrate may be used. The area of wafer 440 being inspected is fabricated based on the area of interest in an IC design layout disclosed herein. For example, the area of interest in the IC design layout (e.g., a GDS file) is used during fabrication to create in the corresponding area on wafer 440. The two areas may have the same or similar structures and layers (but one is virtual and the other is physical). The area of wafer 440 may possibly contain a DOI that occurred during fabrication. Thus, to optimize the detection of such a DOI, an artificial defect representing the DOI may be added to the area of interest in the IC design layout for the purpose of inspection simulation as described above. Note that wafer 440 needs not be created from the specific file containing the IC design layout. Further, the inspected area of wafer 440 needs not have the same size or shape as the area of interest in the IC design layout.

Figure 5:
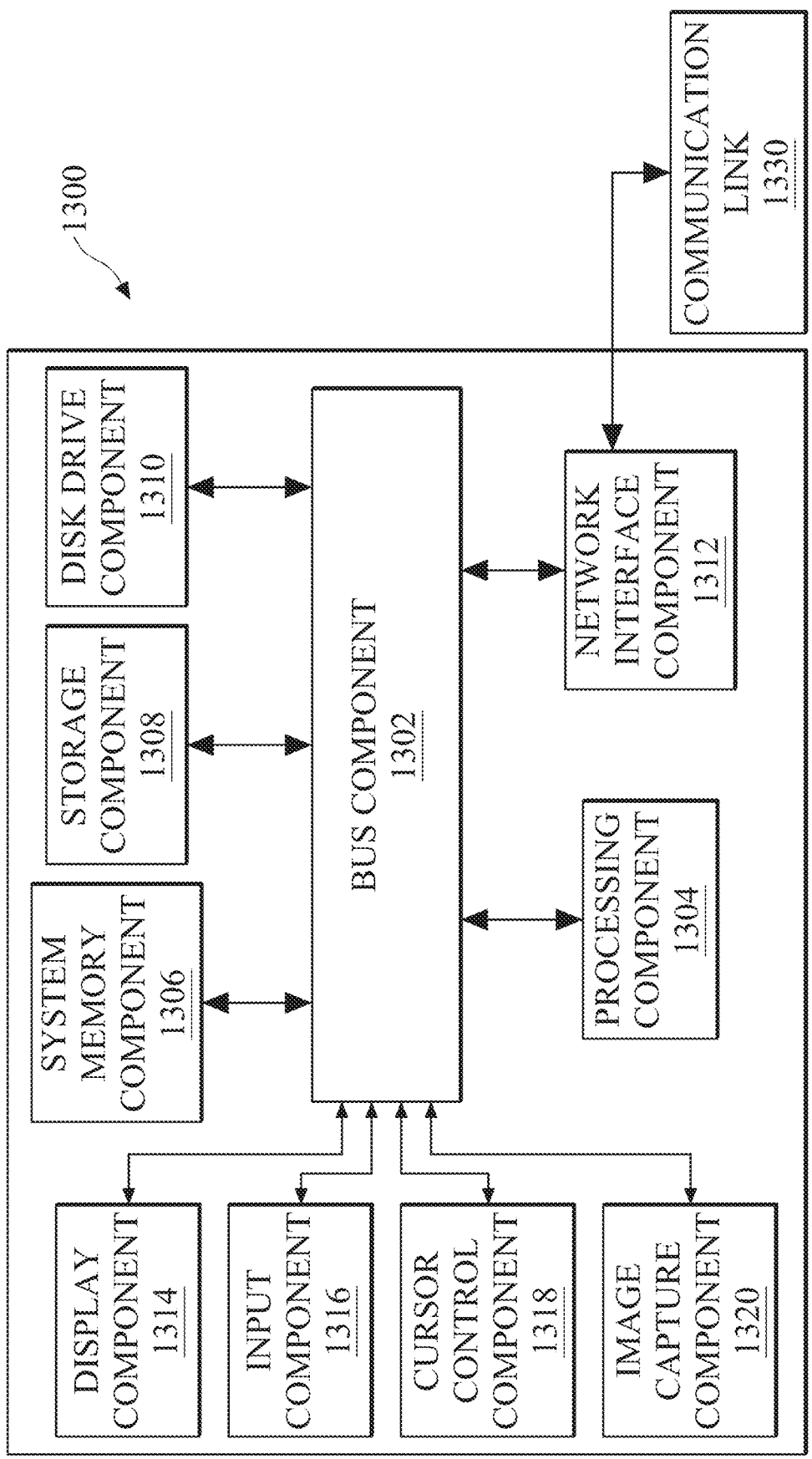
FIG. 5 is a schematic diagram of a computer system capable of implementing the various disclosed methods according to various aspects of the present disclosure.

Inspection system 400 further includes (or is coupled to) a computer system 1300, which is further described in FIG. 5. Computer system 1300 may include a simulation system disclosed herein, and computer system 1300 communicates with detector 430 (or another part of the optical system) to implement methods such as method 100 or 200. In an embodiment, the optical system optically inspects an area of wafer 440 using an optical mode that is provided by computer system 1300. In turn, the optical system generates an optical image 432 for analysis by compute system 1300. Although not shown in FIG. 4, other types of data (e.g., IC design layout, DOI related information, defect detection signals, etc.) may be communicated between the optical system and computer system 1300. The optical image 432 may be any suitable type of output signal, for example, images, image data, signals, image signals, which can be used by computer system 1300 or a user of inspection system 400.

In an embodiment, as part of the process for retraining wafer inspection parameters (e.g., using method 200), inspection system 400 performs an optical inspection on an area of wafer 440 by using a set of optical parameters to generate optical image 432 from wafer 440. One or more defect detection signals may be generated from optical image 432 as described herein, and inspection system 400 may determine, based on the defect detection signals, whether to modify values of the set of optical parameters for inspecting the area of wafer 440. The values of one or more of the set of optical parameters may be modified if the defect detection signals fails to meet predefined criteria, as described above.

FIG. 5 is a block diagram of computer system 1300 suitable for implementing various methods and devices described herein, for example, the various method steps of the method 100 or 200. In various embodiments, the computer system may include a tangible non-transitory computer readable medium comprising executable instructions. These executable instructions, when executed by one or more electronic processors, cause the one or more electronic processors to perform the steps of the method 100 or 200. In some implementations, devices capable of performing the steps may comprise a network communications device (e.g., mobile phone, laptop, personal computer, tablet, etc.), a network computing device (e.g., a network server, a computer processor, an electronic communications interface, etc.), or another suitable device. Accordingly, it should be appreciated that the devices capable of implementing the method 100 or 200 may be implemented as the computer system 1300 in a manner as follows.

In accordance with various embodiments of the present disclosure, the computer system 1300, such as a network server or a mobile communications device, includes a bus component 1302 or other communication mechanisms for communicating information, which interconnects subsystems and components, such as processor 1304 (e.g., processing component, micro-controller, digital signal processor (DSP), etc.), system memory component 1306 (e.g., RAM), static storage component 1308 (e.g., ROM), disk drive component 1310 (e.g., magnetic or optical), network interface component 1312 (e.g., modem or Ethernet card), display component 1314 (e.g., cathode ray tube (CRT) or liquid crystal display (LCD)), input component 1316 (e.g., keyboard), cursor control component 1318 (e.g., mouse or trackball), and image capture component 1320 (e.g., analog or digital camera). In one implementation, disk drive component 1310 may comprise a database having one or more disk drive components.

In accordance with embodiments of the present disclosure, computer system 1300 performs specific operations by processor 1304 executing one or more sequences of one or more instructions contained in system memory component 1306. Such instructions may be read into system memory component 1306 from another computer readable medium, such as static storage component 1308 or disk drive component 1310. In other embodiments, hard-wired circuitry may be used in place of (or in combination with) software instructions to implement the present disclosure.

Logic may be encoded in a computer readable medium, which may refer to any medium that participates in providing instructions to processor 1304 for execution. Such a medium may take many forms, including but not limited to, non-volatile media and volatile media. In one embodiment, the computer readable medium is non-transitory. In various implementations, non-volatile media includes optical or magnetic disks, such as disk drive component 1310, and volatile media includes dynamic memory, such as system memory component 1306. In one aspect, data and information related to execution instructions may be transmitted to computer system 1300 via a transmission media, such as in the form of acoustic or light waves, including those generated during radio wave and infrared data communications. In various implementations, transmission media may include coaxial cables, copper wire, and fiber optics, including wires that comprise bus 1302.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 1300. In various other embodiments of the present disclosure, a plurality of computer systems 1300 coupled by communication link 1330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1300 may transmit and receive messages, data, information and instructions, including one or more programs (i.e., application code) through communication link 1330 and communication interface 1312. Received program code may be executed by processor 1304 as received and/or stored in disk drive component 1310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure is directed to a method for determining wafer inspection parameters. The method includes identifying an area of interest in an IC design layout, performing an inspection simulation on the area of interest by generating a plurality of simulated optical images from the area of interest using a plurality of optical modes, and selecting, based on the simulated optical images, at least one of the optical modes to use for inspecting an area of a wafer that is fabricated based on the area of interest in the IC design layout.

In some embodiments, during the inspection simulation on the area of interest, each simulated optical image is generated using a respective optical mode by performing the steps of: generating a first image from the area of interest using the optical mode, adding an artificial defect into the area of interest, generating a second image from the area of interest with the artificial defect using the optical mode, and generating the simulated optical image as a difference image by subtracting one of the first and second images from the other. In some embodiments, the artificial defect represents a DOI that is possible to occur in the area of the wafer during fabrication. A type of the DOI and a location of the DOI are specified when the artificial defect is added into the area of interest. The selected optical mode is for use in inspecting the DOI in the area of interest. In some embodiments, the area of interest surrounding the DOI has a size of about 200×200 um^2 or less. In some embodiments, the method further includes adding data relevant to the DOI to a database. The data relevant to the DOI includes the selected optical mode, the type of the DOI, the location of the DOI, and the location of the area of interest. In some embodiments, the plurality of optical modes include first and second optical modes. The plurality of simulated optical images include first and second simulated optical images that are generated from the area of interest using the first and second optical modes, respectively. Selecting at least one of the optical modes based on the simulated optical images includes: computing one or more attributes of the first simulated optical image, computing the one or more attributes of the second simulated optical image, and evaluating the first and second optical modes by comparing the attributes of the first simulated optical image with corresponding attributes of the second simulated optical image. In some embodiments, the first and second optical modes each include optical parameters selected from the group consisting of pixel size, optical wavelength, aperture shape, optical polarization, and focus setting. At least one of the optical parameters has different parameter values for the first and second optical modes. In some embodiments, the one or more attributes include a signal to noise ratio.

Another aspect of the present disclosure is directed to an inspection system including a computer system that is configured to select a portion of an IC design layout and perform an inspection simulation on the portion of the IC design layout. The inspection simulation includes using an optical mode to generate a simulated optical image from the portion of the IC design layout. The computer system is further configured to determine one or more attributes of the simulated optical image for evaluation of the optical mode. In some embodiments, the inspection system further includes an optical system configured to optically inspect an area of a wafer using the optical mode. The area of the wafer is fabricated based at least in part on the portion of the IC design layout.

In some embodiments, the optical mode is a first optical mode and the simulated optical image is a first simulated optical image. The computer system is further configured to: use a second optical mode to generate a second simulated optical image from the portion of the IC design layout, determine the one or more attributes of the second simulated optical image, and evaluate the first and second optical modes by comparing the attributes of the first simulated optical image with corresponding attributes of the second simulated optical image. In some embodiments, the computer system is further configured to designate one of the first and second optical modes in a database as a preferred mode for inspecting the portion of the IC design layout. In some embodiments, the first and second optical modes each include optical parameters selected from the group consisting of pixel size, optical wavelength, aperture shape, optical polarization, and focus setting. At least one of the optical parameters has different parameter values for the first and second optical modes. In some embodiments, using the optical mode to generate the simulated optical image from the portion of the IC design layout includes: generating a first image from the portion of the IC design layout using the optical mode, adding an artificial defect into the portion of the IC design layout, generating a second image from the portion of the IC design layout with the added artificial defect using the optical mode, and generating the simulated optical image as a difference image by subtracting one of the first and second images from the other. In some embodiments, the artificial defect represents a DOI that is possible to occur within an area of a wafer that is fabricated based on the portion of the IC design layout. A type of the DOI and a location of the DOI are specified when the artificial defect is added into the portion of the IC design layout. In some embodiments, the portion of the IC design layout is based on a 3D model, and wherein the inspection simulation further includes using FDTD equations to solve Maxwell boundary conditions. In some embodiments, evaluating the first and second optical modes by comparing the first and second defect detection signals includes using at least one of machine learning, random forest, and mixed model algorithms.

Yet another aspect of the present disclosure is directed to a method for retraining wafer inspection parameters. The method includes performing an optical inspection on an area of a wafer that has been fabricated based on an IC design layout, where the optical inspection includes using a set of optical parameters to generate an optical image from the area of the wafer. The method further includes generating one or more defect detection signals from the optical image, and determining, based on the one or more defect detection signals, whether to modify values of the set of optical parameters for inspecting the area of the wafer. In some embodiments, the method further includes modifying the values of one or more of the set of optical parameters based upon the determination that the one or more defect detection signals have failed to meet predefined criteria. In some embodiments, the set of optical parameters is associated with a first defect according to a database that stores information relevant to the first defect. The area of the wafer includes a second defect that differs from the first defect. The method further includes, after modifying the values of one or more of the set of optical parameters, adding information relevant to the second defect into the database. The information relevant to the second defect includes a type of the second defect, a location of the second defect, and the modified values of the set of optical parameters.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
performing a first optical inspection on an area of a wafer having a defect that has been fabricated based on an integrated circuit design layout, wherein the performing of the first optical inspection comprises using a first set of optical parameters to generate an optical image;
generating a first defect detection signal from the optical image, wherein the first defect detection signal is not associated with the defect;
identifying a second defect detection signal that is different than the first defect detection signal;
performing a second optical inspection of the area to identify the defect by using a second set of optical parameters associated with the second defect detection signal; and
modifying a value of the first set of optical parameters for inspecting the area of the wafer based on the ability of the second set of optical parameters to identify the defect.

2. The method of claim 1, wherein the optical image includes an image of a difference between the area of the wafer without the defect and the area of the wafer with the defect.

3. The method of claim 1, wherein the performing of the first optical inspection on the area of the wafer includes performing a simulated optical inspection on the area of the wafer.

4. The method of claim 1, wherein the defect is selected from the group consisting of an unknown type of defect at a known location, a known type of defect at a new location, and a new type of defect at a new location.

5. The method of claim 4, further comprising performing a layout similarity check to identify the second set of optical parameters, wherein the layout similarity check compares a known defect to the defect.

6. The method of claim 1, further comprising determining that the first set of optical parameters fails to meet predefined criteria for identifying the defect.

7. The method of claim 6, wherein the predefined criteria includes:
generating a set of detection signals associated with the defect;
ranking each detection signal of the set of detection signals; and
wherein each ranked detection signal that is lower than a threshold is deemed to have failed the predefined criteria.

8. A non-transitory machine-readable medium having stored thereon instructions for performing a method comprising machine executable code which when executed by at least one machine, causes the machine to:
perform a first optical inspection on an area of a wafer having a first defect that has been fabricated based on an integrated circuit design layout, wherein the performing of the first optical inspection includes using a first set of optical parameters to generate an optical image;
generate a first attribute from the optical image, wherein the first attribute is not associated with the first defect;
identify a second attribute that is different than the first attribute;
perform a second optical inspection of the area to identify the first defect by using a second set of optical parameters associated with the second attribute;
modify a value of the first set of optical parameters for inspecting the area of the wafer based on the ability of the second set of optical parameters to identify the first defect; and
select the second set of optical parameters for identifying the first defect.

9. The non-transitory machine-readable medium of claim 8, wherein the first attribute includes a first set of attributes.

10. The non-transitory machine-readable medium of claim 9, wherein the first set of attributes includes at least one attribute selected from the group consisting of signal-to-noise ratio, number of defects detected and strength of detection signal.

11. The non-transitory machine-readable medium of claim 8, wherein the machine is further caused to store the second set of optical parameters as a preferred set of optical parameters for the first defect.

12. The non-transitory machine-readable medium of claim 8, wherein the machine is further caused to:
perform a layout similarity check to find a second defect similar to the first defect; and
identify the second attribute based on the second defect.

13. The non-transitory machine-readable medium of claim 8, wherein the first set of optical parameters includes optical parameters selected from the group consisting of pixel size, optical wavelength, aperture shape, optical polarization and focus setting.

14. The non-transitory machine-readable medium of claim 8, wherein the optical image includes an image of a difference between the area of the wafer without the first defect and the area of the wafer with the first defect.

15. A method for determining wafer inspection parameters, the method comprising:
identifying an area of interest in an integrated circuit design layout having a defect;
performing an inspection simulation of the area of interest using a first optical mode to thereby generate a simulated optical image;
providing the simulated optical image to an artificial intelligence structure;
determining, by the artificial intelligence structure, a second optical mode to be used for detecting the defect, the second optical mode being different than the first optical mode for detecting the defect;
selecting the second optical mode for inspection of the defect; and after selecting the second optical mode, inspecting the area of interest on a wafer using the second optical mode.

16. The method of claim 15, wherein the determining by the artificial intelligence structure further includes:
calculating a first set of image attributes by a first portion of the artificial intelligence structure, the first portion being a machine learning structure;
calculating a second set of image attributes by a second portion of the artificial intelligence structure, the second portion being a deep learning structure; and
determining the second optical mode based on the first set of image attributes and the second set of image attributes.

17. The method of claim 16, wherein the first optical mode includes at least one attribute selected from the group consisting of a defect signal, a noise signal, a defect topology information, multi-die adaptive threshold (MDAT) gray level, MDAT offset and defect size.

18. The method of claim 16, wherein the calculating the second set of image attributes further includes:
receiving a set of training images for comparing to the simulated optical image;
generating a third set of image attributes; and
selecting the second set of image attributes from the third set of image attributes.

19. The method of claim 18, further comprising reducing a number of image attributes to be considered by at least half before selecting the second set of image attributes.

20. The method of claim 15, further comprising:
before determining the second optical mode, determining a probability of detection of the defect; and
determining the second optical mode based on the probability of detection.

* * * * *